US007660825B2

(12) United States Patent
Sakai et al.

(10) Patent No.: US 7,660,825 B2
(45) Date of Patent: Feb. 9, 2010

(54) AUDIO/VISUAL CONTENT PROVIDING SYSTEM AND AUDIO/VISUAL CONTENT PROVIDING METHOD

(75) Inventors: Yuichi Sakai, Kanagawa (JP); Toru Sasaki, Tokyo (JP); Yoichiro Sako, Tokyo (JP); Toshiro Terauchi, Tokyo (JP); Kosei Yamashita, Kanagawa (JP); Yasushi Miyajima, Kanagawa (JP); Motoyuki Takai, Tokyo (JP)

(73) Assignee: Sony Corporation, Tokyo (JP)

( * ) Notice: Subject to any disclaimer, the term of this patent is extended or adjusted under 35 U.S.C. 154(b) by 580 days.

(21) Appl. No.: 11/227,187

(22) Filed: Sep. 16, 2005

(65) Prior Publication Data

US 2006/0080357 A1 Apr. 13, 2006

(30) Foreign Application Priority Data

Sep. 28, 2004 (JP) ............................ 2004-281467

(51) Int. Cl.
*G06F 17/00* (2006.01)
*G06F 7/00* (2006.01)

(52) U.S. Cl. ............................... 707/104.1; 707/103 R

(58) Field of Classification Search ............ 707/103 R, 707/104.1
See application file for complete search history.

(56) References Cited

U.S. PATENT DOCUMENTS 5,848,396 A * 12/1998 Gerace ........................ 705/10
5,861,906 A * 1/1999 Dunn et al. .................... 725/87
6,807,367 B1 * 10/2004 Durlach ...................... 386/125
6,807,675 B1 * 10/2004 Maillard et al. ............... 725/35
7,260,601 B1 * 8/2007 Day et al. ................... 709/203
2001/0051559 A1 * 12/2001 Cohen et al. ................... 482/8
2002/0047905 A1 * 4/2002 Kinjo ......................... 348/207
2002/0059573 A1 * 5/2002 Nishio et al. .................... 725/1
2002/0119823 A1 * 8/2002 Beuscher ....................... 463/42
2002/0130902 A1 * 9/2002 Shaouy et al. ............. 345/745

(Continued)

FOREIGN PATENT DOCUMENTS

JP 2000-348050 12/2000

(Continued)

OTHER PUBLICATIONS

Ardissono, Liliana, et al., "Personalized Recommendation of TV Programs", AI*IA 2003, LNCS 2829, Springer-Verlag, Berlin, Germany, Oct. 9, 2003, pp. 474-486.*

(Continued)

*Primary Examiner*—Robert Stevens
(74) *Attorney, Agent, or Firm*—Oblon, Spivak, McClelland, Maier & Neustadt, L.L.P.

(57) ABSTRACT

An audio/visual (AV) content providing system is disclosed. The AV content providing system provides AV contents to audiences who exist in a closed space. The AV content providing system has an audio information obtainment section, an AV content database, an attribute index, a selection section. The audience information obtainment section obtains information that represents audiences who exist in the closed space and information that represents the relationships of the audiences. The AV content database contains one or a plurality of AV contents. The attribute index is correlated with an AV content contained in the AV content database and that describes attributes of the AV content. The selection section collates the information that represents the audiences and the information that represents the relationships of the audiences, and the attribute index and selects an AV content that is provided to the audiences from the AV content database according to the collated result.

25 Claims, 13 Drawing Sheets

U.S. PATENT DOCUMENTS

| | | | | |
|---|---|---|---|---|
| 2002/0133815 | A1 * | 9/2002 | Mizutome et al. | 725/9 |
| 2003/0033157 | A1 * | 2/2003 | Dempski et al. | 705/1 |
| 2003/0066078 | A1 * | 4/2003 | Bjorgan et al. | 725/34 |
| 2003/0101227 | A1 * | 5/2003 | Fink | 709/207 |
| 2003/0126013 | A1 * | 7/2003 | Shand | 705/14 |
| 2003/0195021 | A1 * | 10/2003 | Yamashita et al. | 463/1 |
| 2004/0013398 | A1 * | 1/2004 | Miura et al. | 386/46 |
| 2004/0019901 | A1 * | 1/2004 | Spio | 725/25 |
| 2004/0032486 | A1 * | 2/2004 | Shusman | 348/14.09 |
| 2004/0088212 | A1 * | 5/2004 | Hill | 705/10 |
| 2004/0148197 | A1 * | 7/2004 | Kerr et al. | 705/2 |
| 2005/0097595 | A1 * | 5/2005 | Lipsanen et al. | 725/25 |
| 2005/0144632 | A1 * | 6/2005 | Mears et al. | 725/15 |
| 2005/0154972 | A1 * | 7/2005 | Bodin et al. | 715/500.1 |
| 2005/0166233 | A1 * | 7/2005 | Beyda et al. | 725/46 |
| 2005/0186947 | A1 * | 8/2005 | Miller et al. | 455/414.1 |
| 2005/0273833 | A1 * | 12/2005 | Soinio | 725/113 |
| 2006/0159109 | A1 * | 7/2006 | Lamkin et al. | 370/401 |
| 2006/0200841 | A1 * | 9/2006 | Ramaswamy et al. | 725/1 |
| 2007/0198267 | A1 * | 8/2007 | Jones et al. | 704/257 |

FOREIGN PATENT DOCUMENTS

| | | |
|---|---|---|
| JP | 2003-271635 | 9/2003 |
| JP | 2004-054376 | 2/2004 |
| JP | 2004-227158 | 8/2004 |

OTHER PUBLICATIONS

Goren-Bar, Dina, et al., "FIT-recommending TV programs to family members", Computers & Graphics, vol. 28, Issue 2, Apr. 2004, pp. 149-156.*

Barbieri, Mauro, et al., "A Personal TV Receiver with Storage and Retrieval Capabilities", UM '01: Workshop on Personalization in Future TV, © 2001, pp. 1-8.*

Gena, Cristina, et al., "On the Construction of TV Viewer Stereotypes Starting from Lifestyle Surveys", UM '01: Workshop on Personalization in Future TV, © 2001, pp. 1-4.*

Ardissono, Liliana, et al., "Tailoring the Recommendation of Tourist Information to Heterogeneous User Groups", OHS/SC/AH 2001, LNCS 2266, Springer-Verlag, Berlin, Germany, © 2002, pp. 280-295.*

Pashtan, Ariel, et al., "Adapting Content for Wireless Services", IEEE Internet Computing, vol. 7, Issue 5, Sep./Oct. 2003, pp. 79-85.*

Pashtan, Ariel, et al., "Adapting Content for wireless web Services", IEEE Internet Computing, vol. 7, Issue 5, Sep./Oct. 2003, pp. 79-85.*

Jota, Ricardo, et al., "Experimenting with a Flexible Awareness Management Abstraction for Virtual Collaboration Spaces", SAINT '03, Jan. 27-31, 2003, pp. 56-64.*

Spangler, William E., et al., "Using Data Mining to Profile TV Viewers", Communications of the ACM, vol. 46, Issue 12, Dec. 2003, pp. 67-72.*

* cited by examiner

Fig. 5

| KEYWORD CLASS | EXAMPLE OF WORD | CATEGORY | ESTIMATED SPEAKER | ESTIMATED OBJECT |
|---|---|---|---|---|
| INDIVIDUAL IDENTIFICATION KEYWORD | "BOKU" | SPEAKER | MALE | AGE GROUPS AND SEXES OF SPEAKER AND LISTENER |
| | "ORE" | | MALE | |
| | "WATASHI" | | ADULT | |
| | "ATASHI" | | FEMALE | |
| | "WASHI" | | ADULT MALE | |
| | "O-TOU-SAN" | LISTENER | ADULT MALE | |
| | "O-KAA-SAN" | | ADULT FEMALE | |
| | "PAPA" | | ADULT MALE | |
| | "MAMA" | | ADULT FEMALE | |
| | "○○ CHAN" | | CHILD | |
| RELATIONSHIP IDENTIFICATION KEYWORD | "× × SAN" | CALLING | FRIENDS, ACQUAINTANCES, LOVING COUPLE | HUMAN RELATIONSHIP WITH LISTENER |
| | "△△-CHAN" | | FRIENDS, LOVING COUPLE, WIFE, CHILD | |
| | "HAJIME-MASHITE" | GREETING | FIRST MEETING | |
| | "OGENKI-DESHITA -KA" | | ACQUAINTANCES | |
| | "SUKI-DA" | EMOTION | LOVING COUPLE | |
| | "AISHITE-IRU" | | MARRIED COUPLE LOVING COUPLE | |
| CONTENT EVALUATION KEYWORD | "NATSUKASHII-NE" | EMOTION | GOOD | CONTENT EVALUATION |
| | "II-KYOKU-DA-NE" | | | |
| | "MIMIGA-ITAKU-NARUYO" | | BAD | |
| | "WAZURAWASHII-NE" | | | |

Fig. 6

FIRST ATTRIBUTE (INFORMATION THAT REPRESENTS AV CONTENT )

AV CONTENT NAME: XXXXX

| | |
|---|---|
| DURATION | OMINUTES, × × SECONDS |
| GENRE | CLASSIC |
| TEMPO | FAST |
| RHYTHM | WALTZ |
| PSYCHOLOGICAL EVALUATION | RELAXING |

Fig. 7A

SECOND ATTRIBUTE (SUITABILITIES TO AUDIENCES)
FIRST CHARACTERISTIC (EVALUATION LEVELS IN TERMS OF AGE GROUPS AND SEXES)

| AGE GROUP \ SEX | MALE | FEMALE |
|---|---|---|
| AGE 60 OR HIGHER | C | B |
| AGES 11 TO 59 | A | B |
| AGES 7 TO 10 | B | A |
| INFANT | D | C |

Fig. 7B

SECOND CHARACTERISTIC (EVALUATION LEVELS IN TERMS OF PLACES AND TIME ZONES)

| TIME ZONE \ PLACE | RESTAURANT | LIVING ROOM | MEETING ROOM |
|---|---|---|---|
| MORNING | B | C | A |
| AFTERNOON | C | B | A |
| NIGHT | D | C | B |

Fig. 7C

THIRD CHARACTERISTIC( EVALUATION LEVELS IN TERMS OF AGE DIFFERENCES AND RELATIONSHIPS)

| AGE DIFFERENCE \ RELATIONSHIP | PARENT AND CHILD | MARRIED COUPLE | LOVING COUPLE | ACQUAINT-ANCES | MEETING ATTENDEES |
|---|---|---|---|---|---|
| MALE'S AGE > FEMALE'S AGE | A | B | C | D | D |
| MALE'S AGE = FEMALE'S AGE | NONE | A | A | B | C |
| MALE'S AGE < FEMALE'S AGE | B | C | A | C | C |

Fig. 9B

ESTIMATED RESULTS BASED ON TEMPERATURE DISTRIBUTION PATTERNS

| PERSON | POSITION | AGE/SEX |
|---|---|---|
| A | $(X_1, Y_1, Z_1)$ | INFANT |
| B | $(X_2, Y_2, Z_2)$ | ADULT/MALE |
| C | $(X_3, Y_3, Z_3)$ | ADULT/FEMALE |

Fig. 9C

ESTIMATED RESULTS BASED ON VOICED SOUND ANALYSIS DATA

| SPEECH | POSITION | AGE/SEX | RELATIONSHIP | EMOTION |
|---|---|---|---|---|
| (1) | $(X_1, Y_1, Z_1)$ | INFANT OR FEMALE | PERSON A IS WITH FATHER | — |
| (2) | $(X_2, Y_2, Z_2)$ | ADULT/MALE | — | — |
| (3) | $(X_3, Y_3, Z_3)$ | ADULT/FEMALE | PERSON C IS WITH HUSBAND | CALMING MOOD |

Fig. 9D

COLLATED RESULTS

| PERSON | POSITION | AGE/SEX | RELATIONSHIP | EMOTION |
|---|---|---|---|---|
| A | $(X_1, Y_1, Z_1)$ | INFANT | INFANT | — |
| B | $(X_2, Y_2, Z_2)$ | ADULT/MALE | FATHER | — |
| C | $(X_3, Y_3, Z_3)$ | ADULT/FEMALE | MOTHER | REQUEST CONTENT THAT RELAXES HERSELF |

Fig. 12

INFORMATION STORED IN IC TAG

| CATEGORY | PERSONAL INFORMATION |
|---|---|
| FAMILY NAME | ○○ |
| GIVEN NAME | × × |
| BIRTH DAY | MONTH/DAY/YEAR |
| SEX | MALE |

AUDIO/VISUAL CONTENT PROVIDING SYSTEM AND AUDIO/VISUAL CONTENT PROVIDING METHOD

CROSS REFERENCES TO RELATED APPLICATIONS

The present invention contains subject matter related to Japanese Patent Application JP 2004-281467 filed in the Japanese Patent Office on Sep. 28, 2004, the entire contents of which being incorporated herein by reference.

BACKGROUND OF THE INVENTION

1. Field of the Invention

The present invention relates to an audio/visual content providing system and an audio/visual content providing method that allow audio/visual contents suitable for audiences to be automatically selected and provided to them.

2. Description of the Related Art

Since a long time ago, it has been known that beautiful scene and music allow humans to calm down their soul and encourage them. To use these characteristics, background music (BGM) systems have been installed in work places and stores to improve work efficiency and consumer interest. In hotels, restaurants, and so forth, services that use audio/visual (AV) devices that create atmospheres that fit them have been provided.

In the past, the user needed to select for example music genre or song title of an AV content that an AV device or the like reproduces. The larger the number of music contents becomes, the more troublesome the selection operation becomes. As a method of solving such a problem, patent document 1 describes a technology of defining various attributes, collating favorites of the user with his or her watching/listening history, and providing him or her with his or her favorite AV contents.

[Patent Document 1] Japanese Patent Laid-Open Publication No. 2003-259318

In addition, patent document 2 describes a technology of determining the number of attendees of for example a meeting where a plurality of people exist in the same space, estimating the state of the meeting according to the sound level thereof, and controlling the sound level of the BGM.

[Patent Document 2] Japanese Patent Laid-Open Publication No. HEI 4-268603

SUMMARY OF THE INVENTION

However, the AV content selection method described in patent document 1 is focused on one user. Thus, when a plurality of people exist in the same space, if one AV content is selected for one person, the other people who exist in the same space may hate the selected AV content. When fast-tempo high-beat music is selected for a person according to his or her favorite or his or her watching/listening history and provided to him or her, it is thought that another person who exists in the same space may dislike the music and hear it as noise. When a loving couple or a family take a drive, since their human relationships are different, different AV content selection criteria may be applied.

In addition, the technology described in patent document 2 allows the number of attendees who exist in a meeting room to be estimated, not their human relationships to be estimated.

In view of the foregoing, it would be desirable to provide an audio/visual content providing system and an audio/visual content providing method that allow AV contents to reconcile people who exist in the same space according to their relationships.

According to an embodiment of the present invention, there is provided an audio/visual (AV) content providing system that provides AV contents to audiences who exist in a closed space. The AV content providing system has an audio information obtainment section, an AV content database, an attribute index, a selection section. The audience information obtainment section obtains information that represents audiences who exist in the closed space and information that represents the relationships of the audiences. The AV content database contains one or a plurality of AV contents. The attribute index is correlated with an AV content contained in the AV content database and that describes attributes of the AV content. The selection section collates the information that represents the audiences and the information that represents the relationships of the audiences, and the attribute index and selects an AV content that is provided to the audiences from the AV content database according to the collated result.

According to an embodiment of the present invention, there is provided an audio/visual (AV) content providing method of providing AV contents to audiences who exist in a closed space. Information that represents audiences who exist in the closed space and information that represents the relationships of the audiences are obtained. The information that represents the audiences, the information that represents the relationships of the audiences, and an attribute index are collated. The attribute index is correlated with an AV content contained in an AV content database that contains one or a plurality of AV contents and that describes attributes of the AV content. An AV content that is provided to the audiences is selected from the AV content database according to the collated result.

As described above, according to an embodiment of the present invention, information that represents audiences who exist in a closed space and information that represents the relationships of the audiences are obtained. The information that represents the audiences and the information that represents the relationships of the audiences are collated with an attribute index that describes attributes of an AV content contained in an AV content database that contains one or a plurality of AV contents. According to the collated result, an AV content is selected from the AV content database. Thus, AV contents that are suitable to the audiences who exist in the closed space can be provided. As a result, all the audiences who exist in the closed space can spend comfortable time.

According to an embodiment of the present invention, the age, sexes, and relationships of the audiences are estimated according to temperature distribution information and voiced sound information. In addition, since AV contents are selected according to the suitability to a place, a time zone, and so forth are considered, AV contents suitable to listeners and places can be provided.

In addition, according to an embodiment of the present invention, since AV contents suitable to the place are selected according to the estimated results of the ages, sexes, and relationships of the audiences, all the audiences who exist in the place can spend comfortable time.

In addition, according to an embodiment of the present invention, in addition to the ages, sexes, and relationships of the audiences, changes in the emotions of the audiences are also estimated. Thus, according to changes in the emotions of the audiences, AV contents can be changed. Thus, even if moods of the audiences change, they do not feel uncomfortable with the AV contents.

In addition, since AV contents are automatically selected from many AV contents, AV contents that are suitable to the place can be provided and the audiences do not need to remember song titles.

These and other objects, features and advantages of the present invention will become more apparent in light of the following detailed description of a best mode embodiment thereof, as illustrated in the accompanying drawings.

BRIEF DESCRIPTION OF THE DRAWINGS

The invention will become more fully understood from the following detailed description, taken in conjunction with the accompanying drawings, wherein similar reference numerals denote similar elements, in which:

FIG. 5 is a schematic diagram showing examples of keywords contained in a speech;

FIG. 6 is a schematic diagram showing examples of items of a first attribute in the case that an AV content is music;

FIG. 7A, FIG. 7B, and FIG. 7C are schematic diagrams showing examples of items of a second attribute that represents suitabilities to audiences;

FIG. 9A, FIG. 9B, FIG. 9C, and FIG. 9D are schematic diagrams showing an example of a method of estimating the positions, number, ages, sexes, and relationships of audiences;

FIG. 12 is a schematic diagram showing an example of information stored in an IC tag.

DETAILED DESCRIPTION OF THE PREFERRED EMBODIMENTS

Figure 1:
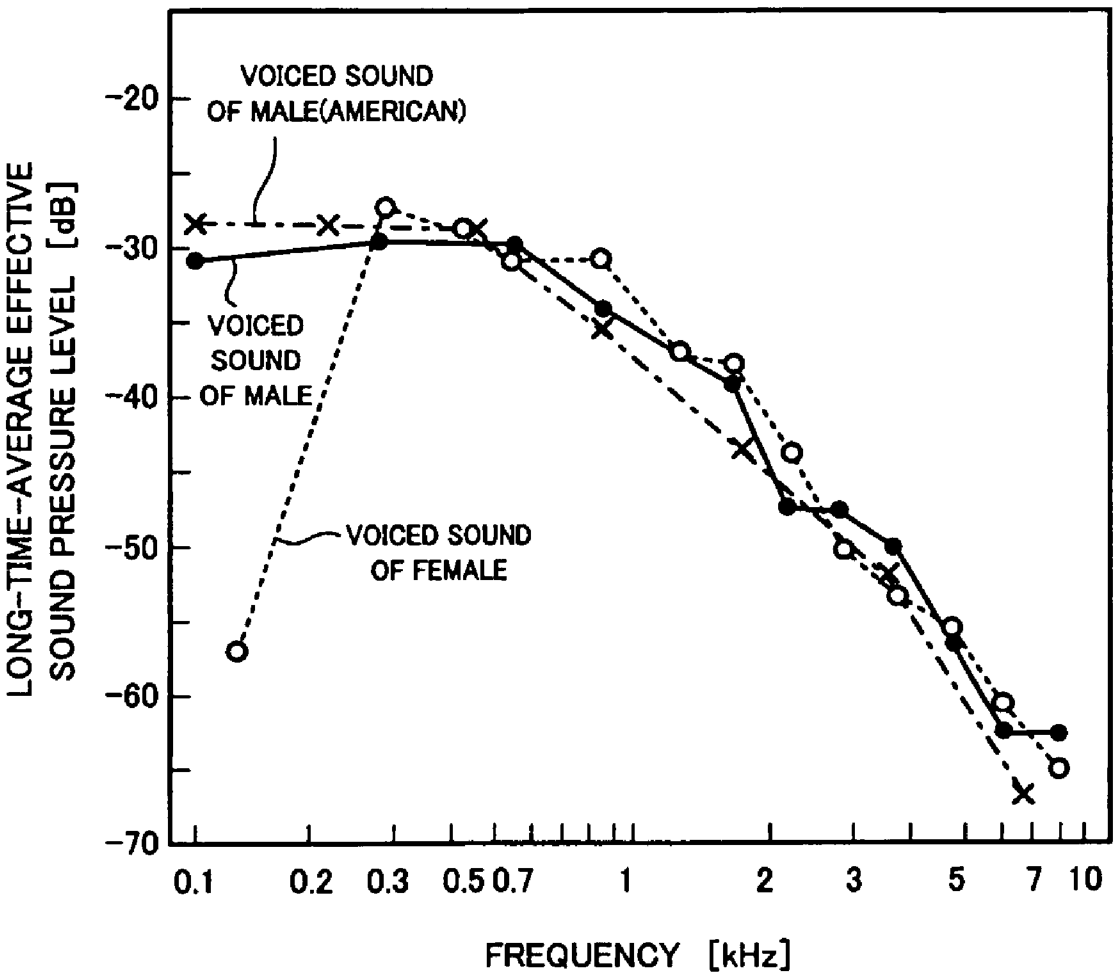
FIG. 1 is a schematic diagram showing spectrum-analyzed characteristics of voiced sounds of males and a female.

Next, a first embodiment of the present invention will be described. First of all, the concept of an AV content providing system according to the first embodiment of the present invention will be described. The AV content providing system estimates the ages, sexes, relationships, and so forth of the audiences who exist in a particular space and provides optimum AV contents selected from a plurality of AV contents to the audiences according to the estimated information.

Next, a method of estimating the ages, sexes, and relationships of audiences who exist in the same space will be briefly described. The ages and sexes of the audiences can be estimated according to body temperatures, voice qualities, and so forth of the audiences. In addition, the relationships of the audiences can be estimated according to the contents of speeches, ages, sexes, and so forth of the audiences.

For example, the positions and number of audiences who exist in the space are obtained. By obtaining the body temperatures and voiced sounds of the audiences identified by the information of the positions and number of the audiences, the ages and sexes of the audiences are estimated. In addition, by obtaining voiced sound information in the space, people who speak are identified according to the positions and number of the audiences. The relationships of the audiences are estimated according to the contents of the speeches.

On the other hand, attributes of AV contents are correlated with attributes that represent suitabilities to the ages, sexes, and relationships of audiences. The ages, sexes, and relationships of audiences who exist in the space are collated with attributes correlated with AV contents. As a result, AV contents provided to the audiences who exist in the space are provided are selected.

First of all, a method of estimating the positions and number of audiences who exist in a space will be described. The positions and number of audiences can be estimated according to temperature distribution information and voiced sound information in the space. When the measured result of the temperature distribution in the space and temperature distribution patterns that represent human body temperatures and their distribution regions are compared and it is determined whether the temperature distribution in the space matches the temperature distribution patterns, the number and positions of the audiences who exist in the space can be estimated.

By analyzing the frequency and time series of the voiced sound information, the positions and number of audiences can be estimated. On the other hand, since information of audiences who do not speak is not detected, by using both the estimated result of the temperature distribution information and the estimated result of the voiced sound information, the positions and number of audiences who exist in the space can be more accurately estimated than by using either of them.

Next, a method of estimating the ages, sexes, and relationships of audiences who exist in the same space will be described. The ages, sexes, and relationships of audiences who exist in the same space can be estimated according to temperature distribution information and voiced sound information. It is known that the temperature distribution patterns of human bodies depend on for example their ages and sexes. When the body temperatures of an adult male, an adult female, and an infant are compared, the body temperature of the adult male is the lowest, the body temperature of the infant is the highest. The body temperature of the adult female is between that of the adult male and that of the infant. Thus, when the temperature distribution in the space is measured, the number and positions of audiences who exist in the space are obtained, and the temperatures at the positions of the audiences are checked, the ages and sexes of the audience can be estimated.

When the spectrums of the voiced sound signals and speeches are analyzed, the ages, sexes, and relationships of the audiences can be estimated.

Figure 2:
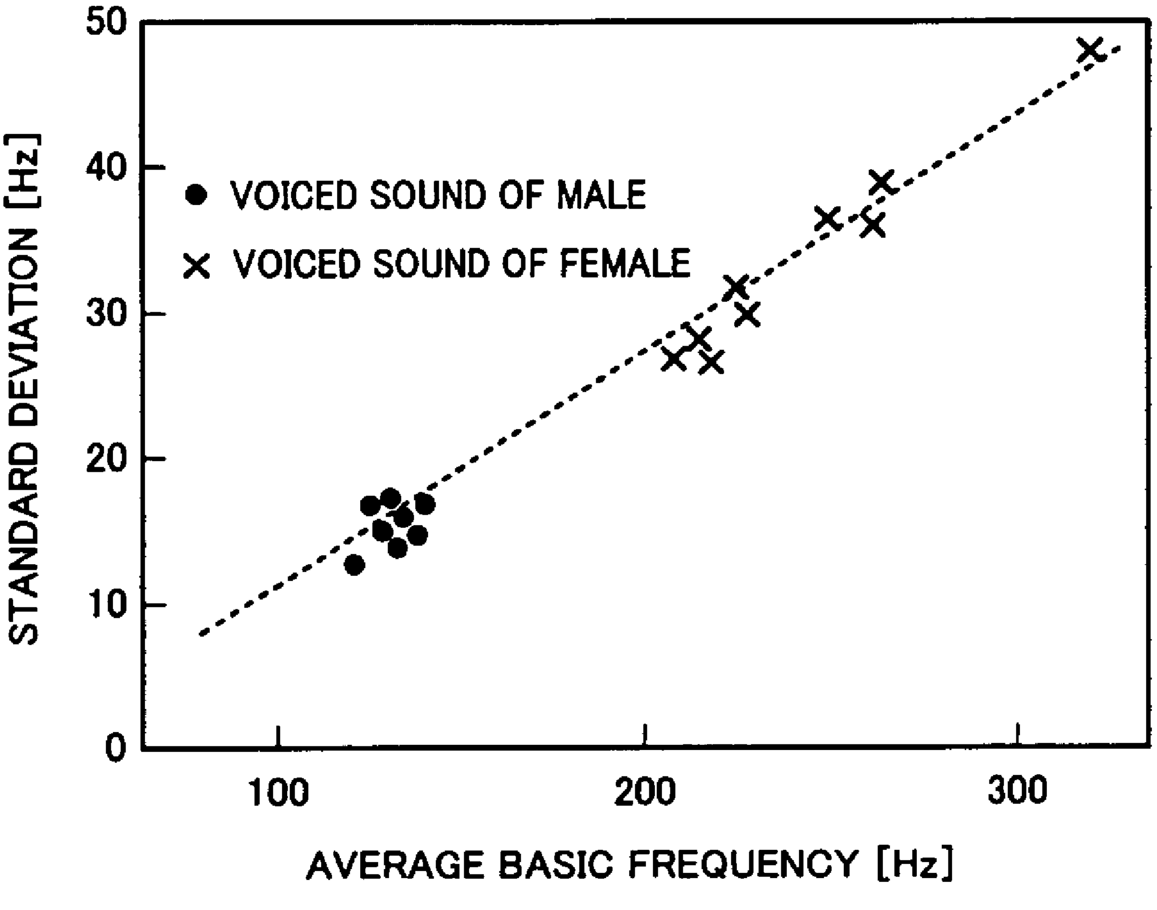
FIG. 2 is a schematic diagram showing spectrum-analyzed characteristics of voiced sounds of a male and a female.
Figure 3:
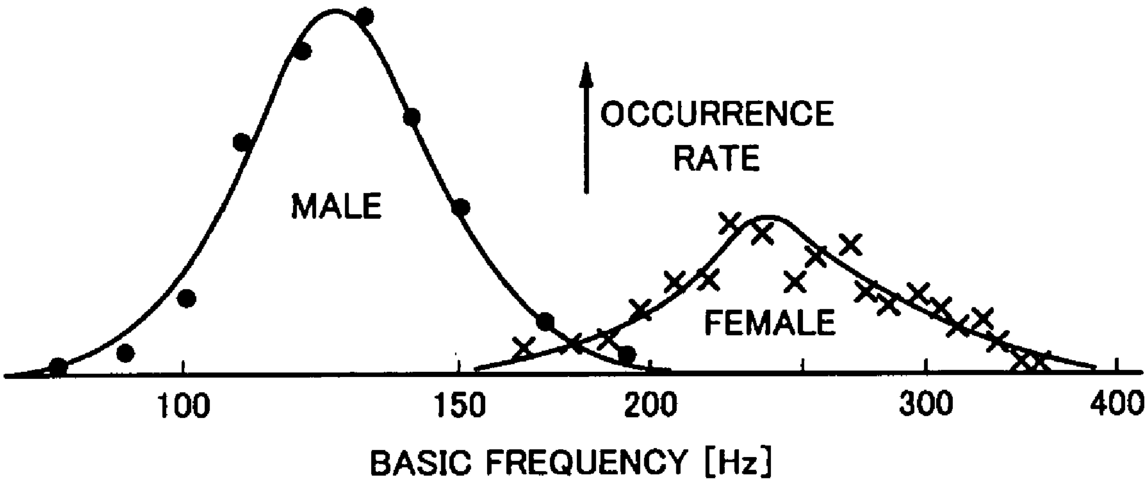
FIG. 3 is a schematic diagram showing spectrum-analyzed characteristics of voiced sounds of a male and a female.
Figure 4:
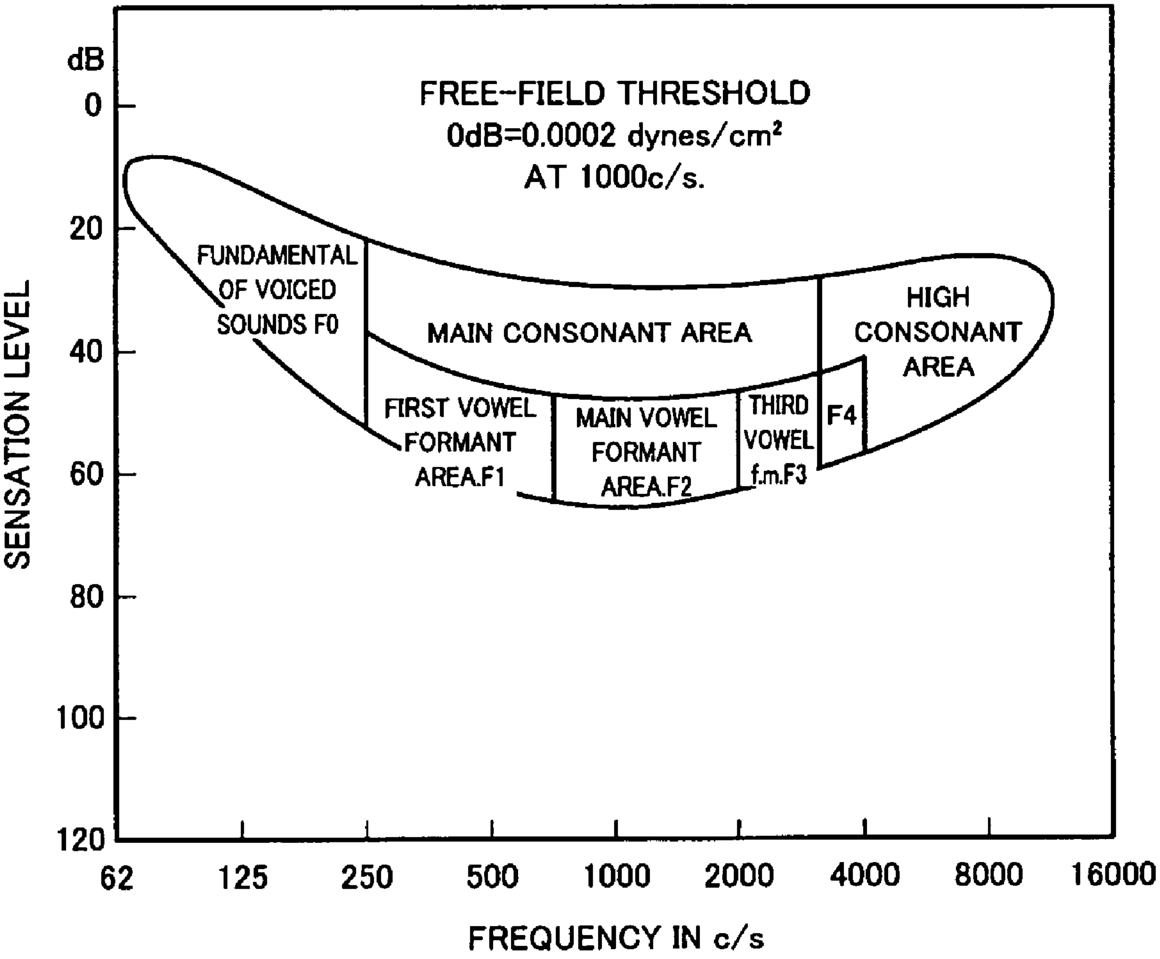
FIG. 4 is a schematic diagram showing characteristics of voiced sounds.

A first analysis that estimates the ages and sexes of the audiences is a spectrum analysis for voiced sound signals. It is known that the spectrum analysis of voiced sounds depend on ages and sexes of audiences. According to statistic characteristics of voice voiced sound signals, it is known that voiced sounds of males and females have characteristics. FIG. 1 shows that the sound pressure level in a low frequency band of around 100 Hz of males are higher than those of females. FIG. 2 and FIG. 3 shows that the basic frequencies, which are frequencies having high occurrence rates, of males and females are around 125 Hz and 250 Hz, respectively. Thus, it is clear that the basic frequency of the females is around twice as high as that of males. Physical factors that define acoustic characteristics of voiced sounds include a resonance characteristic of vocal tract and a radiation characteristic of a sound wave from a nasal cavity. The spectrums of voiced sounds contain several crests according to resonances of the vocal tract, namely formants. For example, as shown in FIG. 4, regions of formants of vowels and formants of consonants are nearly obtained.

According to these characteristics of voiced sounds, when there are two people, person A and person B, in a particular space, and low regions of sound spectrum distributions of the two people are different, it can be estimated that the sound pressure level in the low range of the sound spectrum of a male is higher than that of a female.

A second analysis is a speech analysis. A voiced sound signal is converted into for example text data. With the test data, the contents of the speech are analyzed. As a practical example, the obtained voiced sound signal as an analog signal is converted into digital data. By comparing the digital data with a predetermined pattern, the digital data are converted into text data. By collating the text data with pre-registered keywords, the speeches of the audiences are analyzed. When the speeches of the audiences contain words as keywords that represent individuals, sexes, and relationships of the audiences, according to the keywords, the sexes and relationships of the audiences can be estimated. It should be noted that the analyzing method of speeches is not limited to this example. Instead, by directly collating a voiced sound signal pattern with sound patterns of pre-registered keywords, the speeches of the audiences may be analyzed.

As software that analyzes speeches of audiences with voiced sound signals, ViaVoice, which is Japanese voice recognition software, International Business Machine (IBM) Corp., has been placed on the market.

Next, a specific example of a keyword analysis for speeches will be described. When two people, person A and person B, exist in a particular space, if speeches of person A said “Dad, we are hungry, aren’t we?” and person b said “Dear OO, we will arrive at a restaurant soon. Let’s eat something there.” are detected, since the speech of person A contains “Dad” and the speech of person B contains “Dear OO”, it can be estimated that the relationships of person A and person B are a child and a parent. When the analyzed results such as ages and sexes obtained from the first analysis are added to the analyzed results of the second analysis, the relationships of the audiences can be more accurately estimated.

In the second analysis, it is not necessary to accurately detect all words of speeches. Instead, it is sufficient to detect predetermined keywords. Keywords that contain words with which individuals and human relationships can be estimated and words with which contents can be evaluated are used. FIG. 5 shows categories and examples of keywords. In this example, keywords are categorized as three types, which are an individual identification keywords, relationship identification keywords, and content evaluation keywords.

Individual identification keywords are keywords that allow the ages and sexes of individuals to be estimated. Individual identification keywords are for example “boku” (meaning “I or me” in English and used by young males in Japanese), “ore” (meaning “I or me” in English and used by young males in Japanese), “watashi” (meaning “I or me” in English and used by adult males and young and adult females in Japanese), “atashi” (meaning “I or me” in English and used by females in Japanese), “washi” (meaning “I” or “me” in English and used by adult males in Japanese), “o-tou-san” (meaning “father” in English and used by everybody in Japanese), “O-kaa-san” (meaning “mother” in English and used by everybody in Japanese), “papa” (meaning “father” in English and used by boys and girls in Japanese), “mama” (meaning “mother” in English and used by boys and girls in Japanese), “OO chan” (used along with a given name to express familiarity in Japanese). With these keywords, the ages and sexes of individuals can be estimated. For example “boku”, “ore”, “watashi”, “atashi”, “washi”, and so forth are keywords with which the ages and sexes of the speakers can be estimated. “O-tou-san”, “o-kaa-san”, “papa”, “mama”, “OO chan”, and so forth are keywords with which the ages and sexes of the listeners can be estimated.

Relationship identification keywords are keywords with which the relationships with the listener can be estimated. Relationship identification keywords are for example “XX san” (meaning “Mr., Mrs., Miss, etc.” in English), “ΔΔ chan” (meaning “Dear, etc” in English), “hajime-mashite” (meaning “nice to meet you” in English), “ogenki-deshita-ka” (meaning “how are you” in English), “sukida-yo” (meaning “I like you” in English), “aishite-ru” (meaning “I love you” in English), and so forth. For example, “XX san”, “ΔΔ chan”, and so forth are keywords used to call the listener. “Hajime-mashite”, “ogenki-deshita-ka”, and so forth are greeting keywords. “Sukida-yo” and “aishite-ru” are keywords with which the speaker expresses his or her feeling to the listener. With these keywords, the relationships between the speaker and the listener can be estimated.

Content evaluation keywords are keywords with which a provided AV content is be evaluated. The content evaluation keywords are for example “natsukashii-ne” (meaning “nostalgic” in English), “ii-kyokuda-ne” (meaning “good song” in English), “mimiga-itakunaru-yo” (meaning “noisy” in English), and “wazurawashii-ne” (meaning “troublesome in English). “Natsukashii-ne”, “iikyokuda-ne”, and so forth are keywords with which a provided AV content is highly evaluated. “Mimiga-itakunaru-yo”, “wazurawashii-ne”, and so forth are keywords with which a provided AV content is lowly evaluated.

In addition, one keyword may be categorized as a plurality of classes. For example, “suki-da” (meaning “I like you” or “I like it” in English) is a keyword that belong to a relationship identification keyword and a content identification keyword.

Next, attributes of AV contents will be described. Attributes that represent AV contents and attributes that represent suitabilities of AV contents to audiences are correlated with the AV contents. With these attributes, AV contents can be selected according to the estimated results. According to the embodiment of the present invention, the attributes are categorized as the first attribute that represents information that represents AV contents and the second attribute that represents suitabilities to audiences.

The first attribute is information that represents AV contents. In the first attribute, items that psychologically affect the audiences are correlated with AV contents. When the AV contents are music, items that psychologically affect the audiences are considered to be duration, genre, tempo, rhythm, and psychologically evaluated items. FIG. 6 shows examples of the items of the first attributes of the music AV contents. Duration represents the length of a song. Genre represents a song genre that includes classic, jazz, children song, chanson, blues, and so forth. Tempo represents a music speed that includes fast, very fast, very slow, slow, intermediate, and so forth. Rhythm represents a music rhythm that includes waltz, march, and so forth. Psychological evaluation represents mood of the listeners who listen to the music of the AV content. Mood includes relaxing, energetic, highly emotional, and so forth. The items of the first attribute are not limited to these examples. Instead, AV contents may be correlated with artist names, lyric writers, song composers, and so forth.

Items of the second attribute are suitabilities of AV contents to audiences. The items of the second attribute, which represent suitabilities to the audiences, include a first characteristic that represents an evaluation of a suitability in terms of for example age and sex, a second characteristic that represents an evaluation of a suitability in terms of for example place and time, and a third characteristic that represents an evaluation of a suitability in terms of for example age difference and relationship. The first to third characteristics of the second attributes have evaluation levels. FIG. 7A to FIG. 7C show examples of the second attribute that represent suitabilities to audiences. In FIG. 7A to FIG. 7C, level A to level D represent evaluation levels of suitabilities. In FIG. 7A to FIG. 7C, level A represents the most suitable, level B represents the second most suitable, level c represents the third most suitable, and level d represents the least suitable.

The first characteristic shown in FIG. 7A represents a suitability to audiences in terms of ages and sexes. Audiences are thought to favor different contents depending on their ages and sexes. In this example, ages are categorized as age groups whose audiences are thought to have common favorite AV contents. Age groups are for example infant (age 6 or less), age group 7 to 10, age group 11 to 59, and age group 60 or over. Sexes are categorized as male and female. In terms of these items, AV contents are evaluated in levels. For example, in FIG. 7A, the suitability of this AV content to audiences of female age group 7 to 10 and audiences of male age group 11 to 59 is assigned level A, which represents the most suitable. In contrast, the suitability of this AV content to audiences of male infant is assigned level D, which is the least suitable.

These age groups are just examples. It is preferred that ages be categorized so that they can be determined according to for example temperature distribution patterns. Since favorite AV contents of infants are not different in sexes, categories of infants in terms of sexes may be omitted. In addition, ages may be categorized in terms of sexes.

The second characteristic shown in FIG. 7B represents a suitability to audiences in terms of time zones and places. AV contents suitable in the morning are thought to be different from those suitable at night. In addition, AV contents suitable to audiences who watch in a bed room are thought to be different from those suitable to audiences who watch in a living room because the purposes of these rooms are different. In this example, time zones are categorized as morning, afternoon, and night. Places are categorized as restaurant, living room, and meeting room depending on purposes of these rooms. Suitabilities of AV contents in terms of these items are evaluated in levels. For example, in FIG. 7B, the suitability of the AV content that audiences watch in a meeting room in the morning or in the afternoon is assigned level A, which is the most suitable. The suitability of this AV content that audiences watch in a restaurant at night is assigned level D, which is the least suitable. Categories of the second characteristic are not limited to the example. Instead, time zones may be finely categorized as time zone 13 to 15, time zone 15 to 17, and so forth. Places may be categorized as other than these examples.

The third characteristic shown in FIG. 7C is a suitability to a plurality of audiences in terms of their relationships. It is thought that AV contents suitable to audiences who are intimate each other are different from those suitable to audiences who are not intimate each other. When the relationships of audiences are a parent and a child, it is thought that their intimateness is high. When many people attend in a meeting, it is thought that their intimateness is low. In this case, it is thought that AV contents that are suitable to the audiences who attend the meeting are different. Even if the intimateness of audiences is high, it is thought that AV contents suitable to audiences are different when they are a parent and a child, a loving couple, or a married couple. When both male and female audiences exist, it is thought that AV contents suitable to them are different depending on their age differences. In this example, the relationships of audiences are categorized as a parent and child, a married couple, a loving couple, acquaintances, and meeting attendees. In addition, the age differences of male and female audiences are categorized depending on whether the male is older than the female, the male is as old as the female, or the male is younger than the female.

Suitabilities of AV contents in terms of the relationships of audiences and age differences of male and female audiences are evaluated in levels. In FIG. 7C, the suitabilities of this AV content to a male parent and a child, a married couple who have the same age, or a loving couple who have the same age are assigned level A, which is the most suitable. The suitabilities of this AV content to acquaintances of a male and a female younger than the male and meeting attendees are assigned level D, which is the least suitability. In this example, the suitability of this AV content to male and female audiences who are a patent and a child whose ages are the same is not defined.

It should be noted that the classes of the third characteristic are not limited to these examples. Instead, the classes of the third characteristic may be subdivided in terms of for example friendliness, cooperation, calmness, confrontation, and so forth.

Next, a method of selecting AV contents according to the first attribute and the second attribute will be described. When AV contents are filtered according to suitability levels assigned to the first to third characteristics of the second attribute, AV contents can be narrowed down from a plurality of AV contents.

In this example, since the relationships of audiences are weighed, AV contents are filtered in the order of the third characteristic, the second characteristic, and the first characteristic of the second attribute. In this example, AV contents are selected with evaluation levels that are assigned threshold values. Threshold values are assigned so that AV contents whose first characteristic, second characteristic, and third characteristic are evaluated in level A or higher, level C or higher, and level B or higher, respectively, are selected.

First, AV contents whose third characteristic is evaluated in level B or higher are selected. Then, from the AV contents that have been filtered according to the third characteristics, AV contents whose second characteristic is evaluated in level C or higher are selected. Finally, from the AV contents that have been filtered according to the second and third characteristics, AV contents whose first characteristic is evaluated in level A or higher are selected. In this manner, AV contents are filtered according to the first to third characteristics. Since AV contents have been filtered, AV contents suitable to the place can be selected.

The filtering order of AV contents is not limited to this example. Instead, the filtering order of AV contents may be changed according to a weighing characteristic. For example, when ages and sexes of audiences are weighed, AV contents are filtered according to the first characteristic.

When suitabilities of AV contents to a plurality of audiences needs to be considered, a group that occupies the majority of them may be used as a selection criterion. For example, according to an age group that occupies the majority of audiences, AV contents may be selected. When there is only one audience, AV contents are filtered according to only the first and second characteristics rather than the third characteristic.

As a result, AV contents suitable to the audience are selected according to the first and second characteristics.

The method of selecting AV contents is not limited to this example. Instead, by weighing characteristics of AV contents rather than evaluation levels of the first to third characteristics, an evaluation function may be obtained. With the obtained evaluation function, AV contents that have the maximum effect may be selected.

Figure 8:
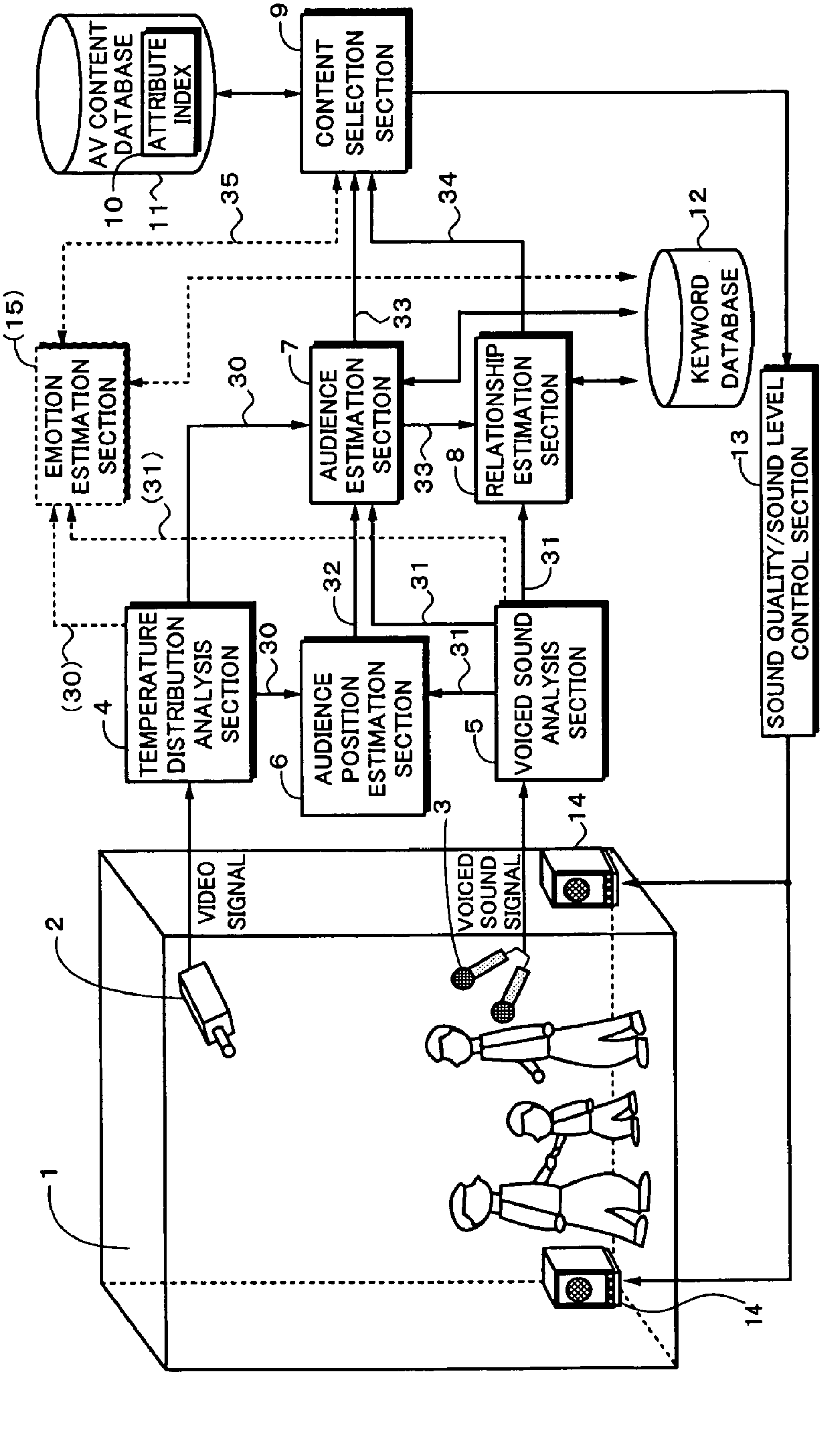
FIG. 8 is a functional block diagram of an AV content providing system according to a first embodiment of the present invention.

Next, with reference to FIG. 8, an AV content providing system according to a first embodiment of the present invention will be described. To estimate the positions and number of audiences in an objective space 1 according to temperature distribution information and voiced sound information, a temperature distribution measurement section and a voiced sound information obtainment section are disposed in the space.

In the objective space 1, as the temperature distribution measurement section, a thermo camera 2 is disposed. An output of the thermo camera 2 is supplied to a temperature distribution analysis section 4. Since the thermo camera 2 receives an infrared ray, converts the infrared ray into a video signal, and outputs the video signal. The temperature distribution analysis section 4 analyzes the video signal that is output from the thermo camera 2. As a result, the temperature distribution analysis section 4 can measure a temperature distribution in the space. At least one thermo camera 2 is disposed at a place where the temperature distribution of the entire space can be measured. It is preferred that a plurality of thermo cameras 2 be disposed so that the temperature distribution in the space can be accurately measured.

The temperature distribution analysis section 4 analyzes the temperature distribution in the space according to the video signal supplied from the thermo camera 2 and obtains temperature distribution pattern information 30. It is thought that the temperature of a portion that is strongly exposed with an infrared ray is high and the temperature of a portion that is weakly exposed with an infrared ray is low. The temperature distribution pattern information 30 that has been analyzed is supplied to an audience position estimation section 6 and an audience estimation section 7.

A microphone 3 obtains voiced sound from the objective space 1 and converts the voiced sound into a voiced sound signal. At least two microphones 3 are disposed so as to obtain stereo sounds. The voiced sound signals that are output from the microphones 3 are supplied to a voiced sound analysis section 5. The voiced sound analysis section 5 localizes sound sources, analyzes sound spectrums, speeches, and so forth according to the localized sound sources, and obtains voiced sound analysis data 31. The obtained voiced sound analysis data 31 are supplied to the audience position estimation section 6, the audience estimation section 7, and a relationship estimation section 8.

The audience position estimation section 6 estimates the positions and number of audiences according to the temperature distribution pattern information 30 supplied from the temperature distribution analysis section 4 and the voiced sound analysis data 31 supplied from the voiced sound analysis section 5. For example, the positions of audiences that exist in the objective space 1 can be estimated according to temperature distribution patterns of the temperature distribution pattern information 30 and the voiced sound localization information. In addition, according to voiced sound spectrum distributions, the number of audiences that exist in the objective space 1 can be estimated. The method of estimating the positions and number of audiences is not limited to these examples. Audience position/number information 32 obtained by the audience position estimation section 6 is supplied to the audience estimation section 7.

A keyword database 12 contains individual identification keywords, relationship identification keywords, content evaluation keywords, and so forth shown in FIG. 5. By comparing keywords contained in the keyword database 12 with the speeches of the audiences, the ages, the sexes, and the relationships of the audiences are estimated and the AV contents that are provided are evaluated.

The audience estimation section 7 estimates the ages and sexes of the audiences who exist in the objective space 1 according to the temperature distribution pattern information 30 supplied from the temperature distribution analysis section 4, the voiced sound analysis data 31 supplied from the voiced sound analysis section 5, and the audience position/number information 32 supplied from the audience position estimation section 6. As described above, the ages and sexes of the audiences can be estimated according to the temperature distribution pattern information 30. In addition, the sexes of the audiences can be estimated according to the voiced sound spectrum distributions. Moreover, by comparing the speeches of the audiences according to the voiced sound analysis data 31 and the individual identification keywords contained in the keyword database 12, the ages and sexes of the audiences can be estimated. Age/sex information 33 obtained by the audience estimation section 7 is supplied to the relationship estimation section 8 and a content selection section 9.

The relationship estimation section 8 estimates the relationships of the audiences according to the voiced sound analysis data 31 supplied from the voiced sound analysis section 5 and the age/sex information 33 supplied from the audience estimation section 7. For example, by comparing the speeches of the audiences according to the voiced sound analysis data 31 and the relationship identification keywords contained in the keyword database 12, the relationships of the audiences can be estimated. Relationship information 34 obtained by the relationship estimation section 8 is supplied to the content selection section 9.

Figure 9A:
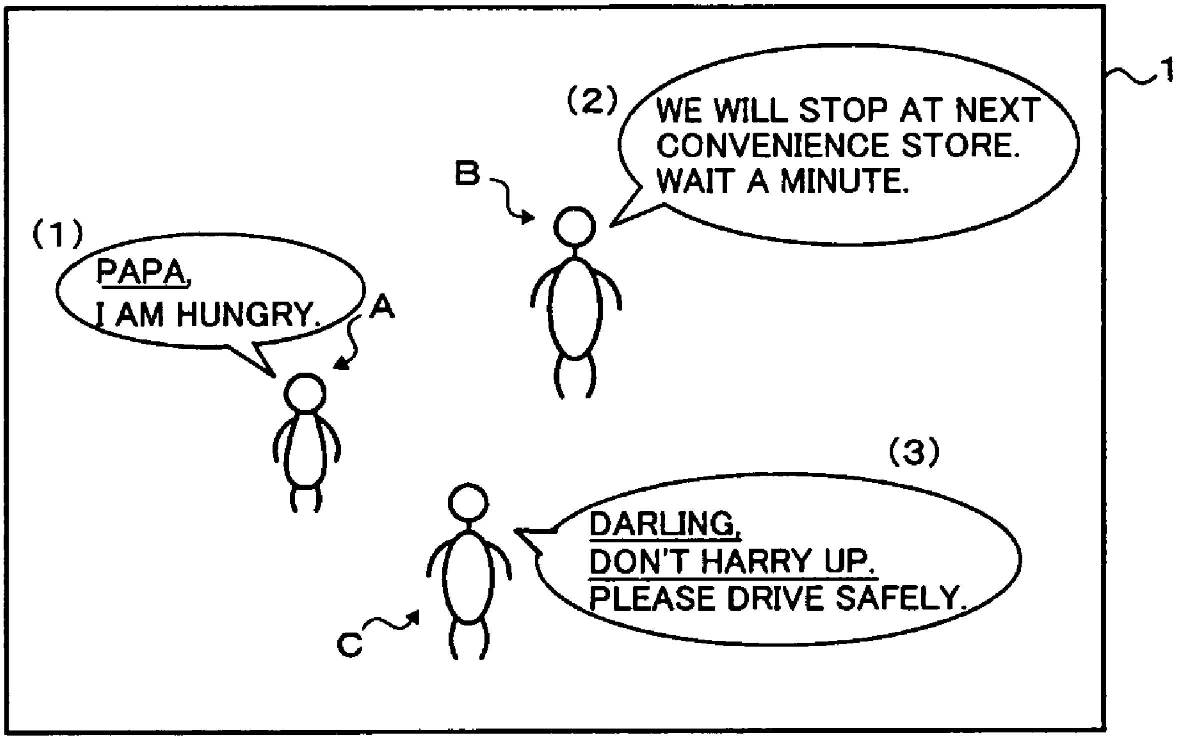

Next, with reference to FIG. 9, an example of a method of estimating the positions, number, ages, sexes, and relationships of audiences will be described. It is assumed that person A, person B, and person C are conversing with each other in a particular space such as "Papa, I am hungry (person A)", "We will stop at the next convenience store. Wait a minute (person B)", and "Darling, do not hurry up. Please, drive safely (person C)". Underscored portions of the speeches shown in FIG. 9A represent keywords contained in the speeches.

According to the temperature distribution pattern information 30 as the video signal captured by the thermo camera 2, the positions and number of the audiences who exist in the objective space 1 can be identified. By analyzing the temperature distribution patterns of the audiences, the ages and sexes of the audiences can be estimated. In this example, according to the temperature distribution patterns, as shown in FIG. 9B, three audiences, person A, person B, and person C, who exist in the space are analyzed. The positions of person A, person B, and person C are analyzed as $(X_1, Y_1, Z_1)$, $(X_2, Y_2, Z_2)$, and $(X_3, Y_3, Z_3)$ respectively. In addition, according to the temperature distribution patterns of the audiences, the body temperatures of the audiences are analyzed and the analyzed results represent that the body temperature of person A is the highest, the body temperature of person C is the lowest, and the body temperature of person B is between that of person A and that of person C. Thus, it can be estimated that person A is an infant, person B is an adult male, and person C is an adult female.

According to the voiced sound analysis data 31 of the voiced sound signals that are output from the microphones 3, the sound sources that exist in the objective space 1 can be localized. According to the localized sound sources, by analyzing the voiced sound spectrum distributions, the sound levels, and so forth of the sound sources, the ages and sexes of people as the sound sources can be estimated. In addition, by analyzing speeches of people, the relationships of the people can be estimated. In this example, as shown in FIG. 9C, according to the voiced sound analysis data 31, three people, person A, person B, and person C, who exist in the space and their positions as coordinates ($X_1$, $Y_1$, $Z_1$), ($X_2$, $Y_2$, $Z_2$), and ($Z_1$, $Z_2$, $Z_3$), respectively, are analyzed. In terms of the ages and sexes, according to the voiced sound spectrum distributions, it is estimated that person A is an infant or a female, person B is an adult male, and person C is an adult female. The speech of person A contains keyword “papa”. The keyword represents that person A is a father. Likewise, the speech of person C contains keyword “darling”. The keyword represents that a married couple exist in the objective space 1 and person C is a wife of the married couple.

The estimated results based on the temperature distribution pattern information 30 and the estimated results based on the voiced sound analysis data 31 are collated. Thus, as shown in FIG. 9D, the positions of person A, person B, and person C are identified as coordinates ($X_1$, $Y_1$, $Z_1$), ($X_2$, $Y_2$, $Z_2$), and ($X_3$, $Y_3$, $Z_3$), respectively. In terms of the ages, sexes, and relationships of the people, it can be estimated that person A is an infant, person B is the father of person A, person B and person C are a married couple, and person C is the wife of person B. The estimated results also represent that person C may be the mother of person A.

In the example shown in FIG. 9, according to keyword “don’t hurry up” detected from the speech of person C, it can be estimated that person C wants to calm down person B. In this case, it is preferred to provide an AV content that calms down person B.

Returning to FIG. 8, an AV content database 11 is composed of a recording medium such as a hard disk. The AV content database 11 contains many sets of attribute indexes 10 and the AV contents. An attribute index 10 contains at least the first attribute and the second attribute. The attribute indexes 10 are correlated with AV contents in the relationship of 1 to 1 according to predetermined identification information and contained in the AV content database 11.

The content selection section 9 filters AV contents contained in the AV content database 11 according to the age/sex information 33 supplied from the audience estimation section 7 and the relationship information 34 supplied from the relationship estimation section 8, and selects AV contents suitable to the objective space 1 from the AV contents according to the attribute indexes 10. A list of selected AV contents is created as an AV content list. According to the AV content list, AV contents are selected from the AV content database 11. AV contents may be randomly selected from the AV content list. Instead, AV contents may be selected in a predetermined order of the AV content list.

The selected AV contents are supplied to a sound quality/sound level control section 13. The sound quality/sound level control section 13 controls the sound quality and sound level of each AV content and supplies the controlled AV contents to an output device 14. When the AV contents are music, the output device 14 is a speaker. The output device 14 outputs AV contents supplied from the sound quality/sound level control section 13 as sound.

After AV contents have been provided, it is preferred that temperature distribution information and voiced sound information be constantly obtained from audiences, the AV contents be evaluated, and changes of audiences be estimated. While an AV content is being provided, when an audience speaks and a content evaluation keyword about the AV content is detected from the speech, an AV content may be selected according to the evaluation keyword. In other words, when a content evaluation keyword is detected from the speech, AV contents are filtered and reselected according to the evaluation keyword of the first attributes of the attribute indexes 10.

When the evaluation level of the detected content evaluation keyword is high, it is determined that the provided AV content be suitable to the place. An AV content similar to the AV content that is being provided is selected according to for example the first attributes of the attribute indexes 10. In contrast, when the evaluation level of the detected content evaluation keyword is low, it is determined that the provided AV content be not suitable to the place. An AV content is selected according to the first attribute. As a result, another AV content suitable to the place is provided.

When states of audiences change while an AV content is being provided, the audiences are re-evaluated according to their relationships and AV contents are selected again. For example, when an infant who is in a car stops speaking or his or her body temperature drops, it is estimated that the infant is sleeping. In this case, AV contents are selected for only audiences who are awake.

In the foregoing AV content providing method, an AV content list is created and AV contents are provided according to the AV content list. However, the AV content providing method is not limited to this example. Instead, AV contents may be filtered according to the second attribute. In this case, only one AV content is selected and provided. Thereafter, the next AV content is selected according to temperature distribution information and voiced sound information that are constantly obtained. By repeating this operation, optimum AV contents may be always provided.

Because the temperature distribution information and voiced sound information of the objective space 1 are not properly obtained, the ages, sexes, and relationships of audiences who exist in the objective space 1 may not be correctly determined. In this case, AV contents may be selected according to only the obtained information. After the necessary information has been obtained, AV contents may be selected. Since AV contents are selected according to only known information, AV contents can be constantly provided without suspension.

Figure 10:
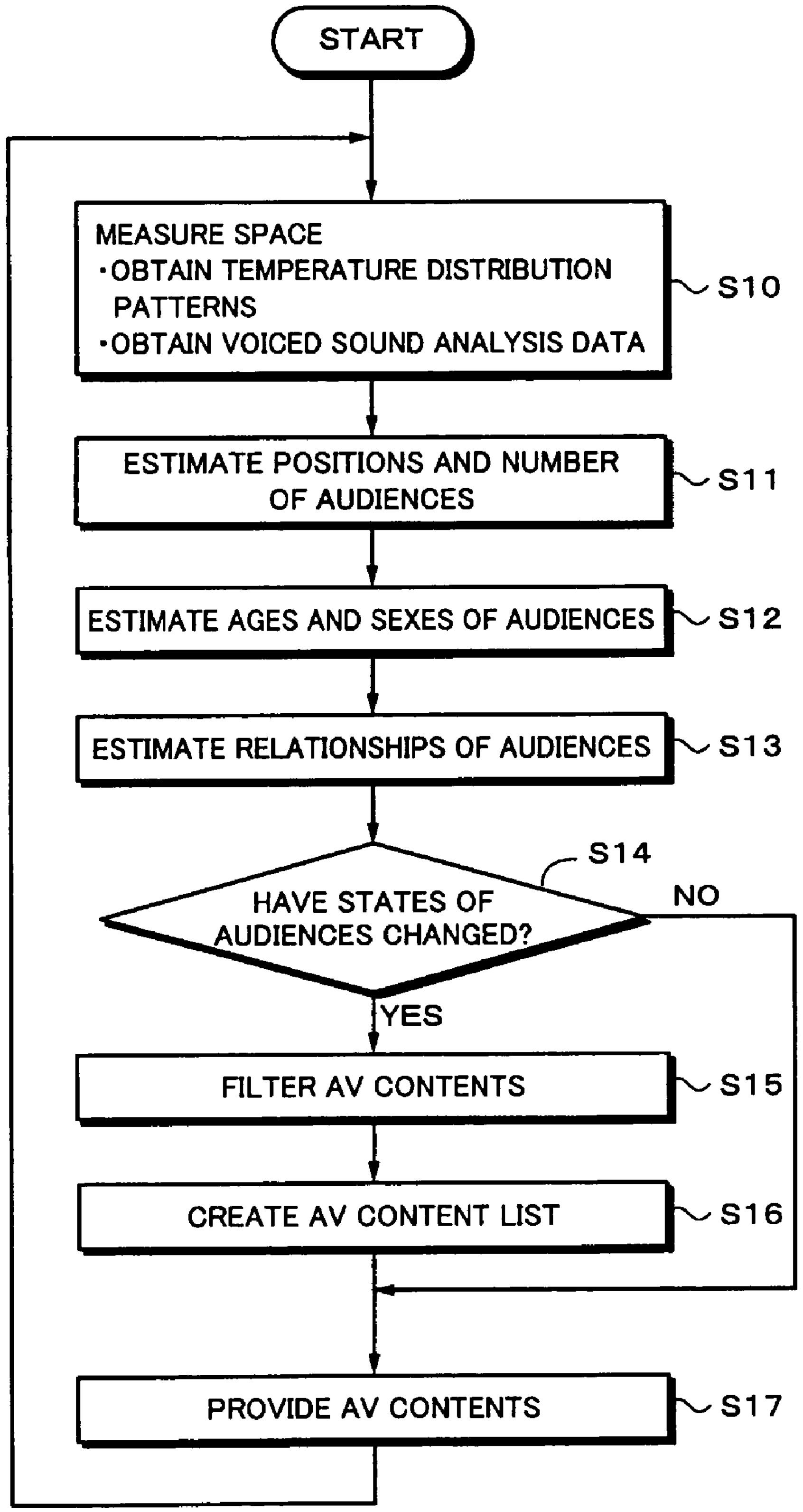
FIG. 10 is a flow chart describing an AV content providing method according to the first embodiment of the present invention.

Next, with reference to a flow chart shown in FIG. 10, the AV content providing method according to the first embodiment of the present invention will be described. In this example, it is assumed that the temperature distribution information and voiced sound information are constantly obtained. In addition, it is assumed that the process of the flow chart shown in FIG. 10 is cyclically repeated. For example, the process of the flow chart shown in FIG. 10 is repeated at intervals of a predetermined time period for example once every several seconds.

At step S10, the objective space 1 is measured by the thermo cameras 2 and the microphones 3. According to the measured results, the temperature distribution analysis section 4 and the voiced sound analysis section 5 obtain the temperature distribution pattern information 30 and the voiced sound analysis data 31, respectively, according to the measured results. At step S11, the audience position estimation section 6 estimates the positions and number of audiences according to the temperature distribution pattern information 30 and the voiced sound analysis data 31 obtained at step S10. At step S12, the audience estimation section 7 estimates the ages and sexes of the audiences according to the temperature distribution pattern information 30 and the voiced analysis data 31 obtained at step S10, and the audience position/number information 32 obtained at step S11. At step S13, the relationship estimation section 8 estimates the relationships of the audiences according to the voiced sound analysis data 31 obtained at step S10 and the age/sex information 33 obtained at step S12.

At step S14, the information obtained at step S10 to step S13 in the current cycle of the process is compared with that of a predetermined time period ago namely in the preceding cycle of the process and it is determined whether the states of the audiences who exist in the objective space 1 have changed. It can be determined whether for example the number, age ranges, and relationships of the audiences who exist in the objective space 1 have changed. With time information, it can be also determined whether time has changed. When the determined result represents that the relationships of the audiences have changed, the flow advances to step S15. When there is no information of the predetermined time period ago, it is assumed that the states of the audiences have changed in the first cycle of the process. Thereafter, the flow advances to step S15.

At step S15, according to the estimated results of the sexes and relationships of the audiences obtained at step S13 to step S13 in this cycle of the process and the attribute indexes 10, the content selection section 9 filters AV contents. At step S16, according to the filtered results, a AV content list is created with reference to the AV content database 11.

At step S17, AV contents are selected at random or in a predetermined order from the AV content list created at step S16. The selected AV contents are output from the AV content database 11 and provided to the objective space 1 through the sound quality/sound level control section 13. After the AV contents have been provided, the flow returns to step S10.

When the determined result at step S14 represents that the relationships of the audiences have not changed, the flow advances to step S17. According to the AV content list created in the preceding cycle of the process, AV contents are selected.

Next, a modification of the first embodiment of the present invention will be described. As denoted by dotted lines in FIG. 8, an emotion estimation section 15 is disposed in the AV content providing system according to the first embodiment of the present invention. After an AV content has been provided, the emotion estimation section 15 estimates changes in the emotions of the audiences. According to the estimated information, it is determined whether the provided AV content is the optimum. In the following, description of sections in common with the first embodiment will be omitted.

Changes in the emotions of the audiences can be estimated according to the temperature distribution pattern information 30 and the voiced sound analysis data 31 of the provided AV content. It is known that when a person is hungry or sleepy and his or her emotion changes, the temperature distribution of the body changes and when he or she is psychologically uncomfortable or stressful, the body temperature drops. Japanese Patent Laid-Open Publication No. 2002-267241 describes that when the temperatures of both the head portion and ears are high, he or she is thought to be angry or irritated. Thus, by comparing the temperature distribution pattern of an audience before an AV content is provided and that after it is provided and analyzing a change of the temperature distribution of his or her body, it can be estimated that his or her emotion has changed.

In terms of voiced sound, it is known that when the emotion of an audience changes, the spectrum distribution of the voiced sound slightly changes. Thus, by comparing the spectrum distribution of voiced sound of an audience before an AV content is provided and that after it is provided and analyzing a change of the spectrum distribution, it can be estimated that the emotion of the audience has changed. When the spectrum distribution of voiced sound is analyzed, if an increase of high frequency spectrum components is detected, it can be estimated that voice of the audience is highly pitched and thereby he or she is excited. When an increase of low frequency spectrum components is detected, since the tone of voice lowers, it can be estimated that the emotion of the audience is calm. Instead, by detecting a change of sound level of a speech of an audience, it can be estimated that his or her emotion has changed.

The emotion change estimating method is not limited to this example. Instead, a change in the emotion of the audience may be estimated according to the speech of the audience. When emotion keywords such as “interesting”, “getting tense”, “tired”, “disappointed”, and so forth are contained in the keyword database 12 and an emotion keyword is detected from the speech of the audience, a change in the emotion can be estimated.

The temperature distribution pattern information 30 that is output from the temperature distribution analysis section 4 and the voiced sound analysis data 31 that are output from the voiced sound analysis section 5 are supplied to the emotion estimation section 15. The emotion estimation section 15 estimates a change in the emotion of the audience according to the temperature distribution pattern information 30 and the voiced sound analysis data 31.

The emotion estimation section 15 estimates a change in the emotion of the audience in the following manner. The emotion estimation section 15 stores the temperature distribution pattern information 30 and the voiced sound analysis data 31 for a predetermined time period, compares the stored temperature distribution pattern information 30 with the temperature distribution pattern information 30 supplied from the temperature distribution analysis section 4, and compares the stored voiced sound analysis data 31 with the voiced sound analysis data 31 supplied from the voice sound analysis section 5. According to the compared results, it is determined whether the emotion has changed. When the compared result represents that the emotion has changed or supposed to have changed, the changed emotion is estimated. The estimated result by the emotion estimation section 15 is supplied as emotion information 35 to the content selection section 9.

The content selection section 9 selects AV contents according to the emotion information 35 and the psychological evaluation item of the first attributes of the attribute indexes 10. In other words, AV contents are filtered and selected according to both the second attribute and the psychological evaluation item of the first attribute. For example, when the determined result represents that the audience is more excited than before the preceding emotion change was detected according to for example the emotion information 35, an AV content whose psychological evaluation item of the first attribute of the attribute index 10 is relax is selected and provided. Instead, an AV content whose tempo item of the first attribute is slow tempo that allows the audience who is excited to be calm may be selected.

Figure 11:
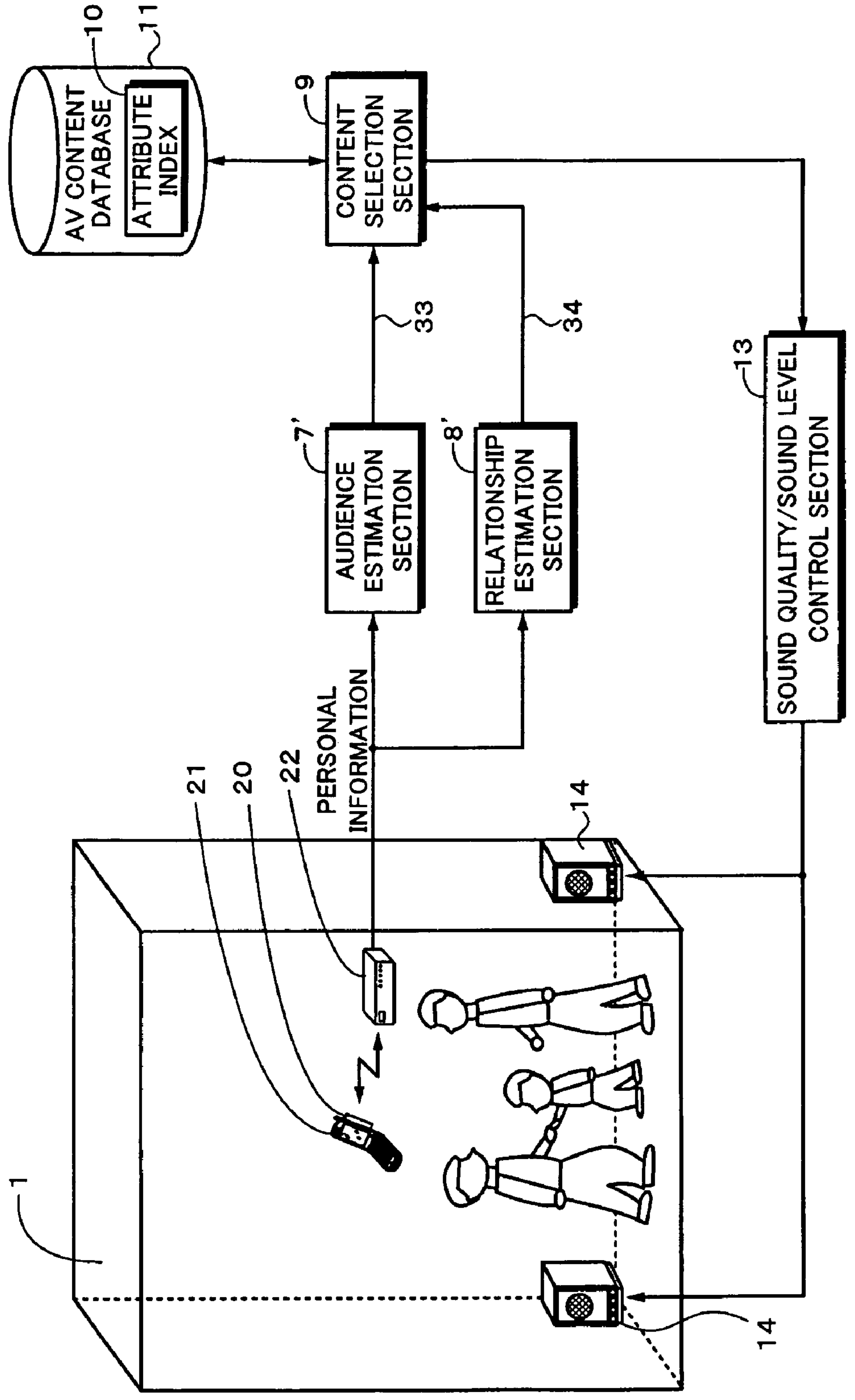
FIG. 11 is a functional block diagram of an AV content providing system according to a second embodiment of the present invention.

Next, with reference to FIG. 11, a second embodiment of the present invention will be described. According to the second embodiment, information that represents audiences is input by a predetermined input section. According to the input information, AV contents suitable to the place are selected. In this example, as the input section for information that represents the audiences, an integrated circuit (IC) tag 20 is used. The IC tag 20 is a wireless IC chip that has a non-volatile memory, transmits and receives information with a radio wave, and writes and reads transmitted and received information to and from the non-volatile memory. In FIG. 11, the same sections as those shown in FIG. 8 are denoted by the same reference numerals and their description will be omitted.

In the following description, an operation of which "a communication is made with an IC tag and information is written to an non-volatile memory of the IC tag" is described as "information is written to the IC tag". An operation of which "a communication is made with an IC tag and information is read from a non-volatile memory of the IC tag" is described as "information is read from the IC tag".

According to the second embodiment of the present invention, with the IC tag 20 that pre-stores personal information, the age and sex of an audience are identified according to the personal information stored in the IC tag 20. In addition, the relationships of the audiences can be estimated. In this example, it is assumed that the IC tag 20 is disposed in a cellular telephone terminal 21.

As shown in FIG. 12, personal information such as the name, birthday, and sex of the audience is pre-stored in the IC tag 20. The personal information may contain other types of information. For example, information that represents favorite AV contents of the audience may be stored in the IC tag 20.

As shown in FIG. 11, an IC tag reader 22 that communicates with the IC tag 20 is disposed in the objective space 1. When the IC tag 20 is approached in a predetermined distance to the IC tag reader 22, it can automatically communicate with the IC tag 20, read information from the IC tag 20, and write information to the IC tag 20. When the audience approaches the IC tag 20 to the IC tag reader 22 disposed in the objective space 1, the IC tag reader 22 reads personal information from the IC tag 20. The personal information that is read to the IC tag reader 22 is supplied to an audience estimation section 7' and a relationship estimation section 8'.

The audience estimation section 7' identifies the ages and sexes of the audiences according to the supplied personal information. Identified age/sex information 33 is supplied to a content selection section 9. The relationship estimation section 8' estimates the relationships of the audiences according to the supplied personal information. The relationships of the audiences can be estimated in such a manner that when audiences have the same family name and the difference of their ages is large, they are a parent and a child. In addition, the organization of audiences may be used to estimate the relationships of the audiences. When one male and one female exist in the objective space 1 and their age difference is small, it can be estimated that they are a married couple or a loving couple. When many males and females exist in the objective space 1 and their age differences are small, it can be estimated that they are acquaintances each other. When many males and females exist in the objective space 1 and their age differences are large, it can be estimated that they are a family. Relationship information 34 estimated by the relationship estimation section 8' is supplied to the content selection section 9.

The content selection section 9 filters AV contents according information that represents the ages, sexes, and relationships of the audiences as attribute indexes 10, selects AV contents with reference to the AV content database 11, and provides the AV contents that are the most suitable in the space.

In the foregoing example, the IC tag 20 was used as a personal information input section. However, the personal information input section is not limited to this example. Instead, the personal information input section may be a cellular telephone terminal 21. A communication section that communicates with the cellular telephone terminal 21 may be disposed in the AV content providing system. The AV content providing system may obtain personal information from the cellular telephone terminal 21 and supply the personal information to the audience estimation section 7' and the relationship estimation section 8'. In the foregoing example, the cellular telephone terminal 21 that has the IC tag 20 was used. Instead, an IC card or the like that has the IC tag 20 may be used.

According to the first embodiment, the modification of the first embodiment, and the second embodiment, AV contents that the AV content providing system provide are music. Instead, the AV contents may be pictures.

When an AV content is a picture, it is thought that items of the first attribute of the attribute index 10 are for example the duration, picture type, genre, psychological evaluation, and so forth. Duration represents the length of a picture. Picture type represents a picture category for example movie, drama, music clip collection of short pictures such as music promotion video, computer graphics, image picture, and so forth. Genre represents a sub category of picture type. When picture type is movie, it is subcategorized as horror, comedy, action, and so forth. Psychological evaluation represents mood considered to be for example relaxing, energetic, highly emotional, and so forth. The items of the first attribute are not limited to these examples. Instead, items of performer and so forth may be added. When an AV content is a picture, the output device 14 may be a monitor or the like.

In the foregoing, AV contents and attribute index 10 are contained in the same AV content database 11. Instead, the attribute indexes 10 may be recoded on a recording medium for example a compact disc-read only memory (CD-ROM) or a digital versatile disc-read only memory different from the recording medium on which the AV content database 11 is stored. At this point, AV contents contained in the AV content database 11 and the attribute indexes 10 stored on the CD-ROM or DVD-ROM are correlated according to predetermined identification information. AV contents are selected according to the attribute indexes 10 recorded on the CD-ROM or the DVD-ROM. The selected AV contents are provided to the audience. For AV contents that are not correlated with the attribute indexes 10, the audience may directly create the attribute indexes 10.

In the foregoing, the AV content database 11 is provided on the audience side. Instead, the content selection section 9 and the AV content database 11 may be provided outside the system through a network. In this case, the AV content providing system transmits the age/sex information 33 and the relationship information 34 to the external content selection section 9 through the network. The external content selection section 9 filters AV contents according to the received information and the attribute indexes 10 and selects proper AV contents from the AV content database 11. The selected AV contents are provided to the audience through the network.

The attribute indexes 10 stored in the external AV content database 11 may be downloaded through the network. The content selection section 9 creates a AV content list according to the downloaded attribute indexes 10 and transmits the AV content list to the external AV content database 11 through the network. The external AV content database 11 selects AV contents according to the received list and provides the AV contents to the audience through the network. Instead, the audience side may have AV contents. The attribute indexes 10 may be downloaded through the network.

It should be understood by those skilled in the art that various modifications, combinations, sub-combinations and alternations may occur depending on design requirements and other factors insofar as they are within the scope of the appended claims or the equivalents thereof.

What is claimed is:

1. An audio/visual (AV) content providing system that provides AV contents to an audience, including more than one individual, which is present within a particular area, comprising:

a processor;

an audience information obtaining unit configured to obtain personal information that represents characteristics of the audience, which is present in the particular area, and relationship information that represents relationships of an individual in the audience to other individuals in the audience;

an AV content database that contains one or a plurality of AV contents;

an attribute index that is correlated with AV content contained in the AV content database and that describes attributes of the AV content; and a selection unit configured to collate the personal information that is representative of the audience, the relationship information that is representative of the relationships within the audience, and the attribute index and selecting an AV content that is provided to the audience from the AV content database according to a collated result, wherein the audience information obtaining unit includes a voiced sound information obtaining unit configured to obtain voiced sound information of the audience from the particular area by at least two microphones; and a first audience information obtaining unit configured to obtain audience number information that represents the number of individuals in the audience who exist in the particular area and audience position information that represents the positions of individuals in the particular area according to the voiced sound information obtained by the voiced sound information obtaining unit.

2. The AV content providing system as set forth in claim 1, wherein the audience information obtaining unit also includes a second audience information obtaining unit configured to analyze speech sounds of the more than one individual in the audience who is present in the particular area according to the audience number information and the audience position information obtained by the first audience information obtaining unit and the voiced sound information obtained by the voiced sound information obtaining unit, obtain speech information of the analyzed speech sounds, estimate the ages and gender of individuals in the audience according to the speech information, and obtain age information and gender information that is representative of the gender and age of the audience.

3. The AV content providing system as set forth in claim 1, wherein the audience information obtaining unit also includes an audience relationship estimation unit configured to analyze speech sounds of the more than one individual in the audience who is present in the particular area according to the audience number information and the audience position information obtained by the first audience information obtaining unit and the voiced sound information obtained by the voiced sound information obtaining unit, obtain speech information of the analyzed speech sounds, estimate the relationships of individuals in the audience according to the speech information, and obtain relationship information that is representative of the relationships of the individuals in the audience.

4. The AV content providing system as set forth in claim 1, wherein the audience information obtaining unit also includes a temperature distribution information obtaining unit configured to obtain temperature distribution information of the particular area.

5. The AV content providing system as set forth in claim 4, wherein the audience information obtaining unit also includes a second audience information obtaining unit configured to estimate the ages and gender of the individuals in the audience according to the audience number information and the audience position information obtained by the first audience information obtaining unit and the temperature distribution information obtained by the temperature distribution information obtaining unit and obtaining age information that is representative of the ages of the individuals in the audience and gender information that is representative of the gender of the individuals in the audience.

6. The AV content providing system as set forth in claim 1, wherein the audience information obtaining unit includes a temperature distribution information obtaining unit configured to obtain temperature distribution information from the particular area; and the audience number information is determined by the voiced sound information obtained by the voiced sound information obtaining unit and the temperature distribution information obtained by the temperature distribution information obtaining unit.

7. The AV content providing system as set forth in claim 6, wherein the audience information obtaining unit also includes a second audience information obtaining unit configured to analyze speech sounds of individuals in the audience who are present in the particular area according to the audience number information and the audience position information obtained by the first audience information obtaining unit and the voiced sound information obtained by the voiced sound information obtaining unit, obtain speech information of the analyzed speech sounds, estimate the ages and gender of the individuals in the audience according to the speech information, and obtain age information that is representative of the age of the audience and gender information that is representative of the gender of the audience; and an audience relationship estimation unit configured to analyze speech sounds of the individuals in the audience who exist in the particular area according to the audience number information and the audience position information obtained by the first audience information obtaining unit and the voiced sound information obtained by the voiced sound information obtaining unit, obtain speech information of the analyzed speech sounds, estimate the relationships of the audience according to the speech information, and obtain relationship information that is representative of the relationships of the individuals in the audience.

8. The AV content providing system as set forth in claim 1, wherein the audience information obtaining unit includes an input unit configured to input at least information that represents the audience; and an audience relationship estimation unit configured to estimate relationship information that is representative of the relationships of the audience according to the information that represents the audience that is input by the input unit.

9. The AV content providing system as set forth in claim 8, wherein the input unit receives the personal information that represents the audience that is transmitted from the outside of the system and inputs the personal information that represents the audience to the system.

10. The AV content providing system as set forth in claim 9, wherein the input unit receives the personal information that represents the audience, the information being transmitted from an IC tag.

11. The AV content providing system as set forth in claim 9, wherein the input unit receives the personal information that represents the audience, the information being transmitted from a portable terminal.

12. The AV content providing system as set forth in claim 1, wherein the attribute index includes a first attribute composed of an attribute of an AV content; and a second attribute composed of a suitability of the AV content to the audience.

13. The AV content providing system as set forth in claim 12, wherein the first attribute contains a psychological evaluation of the AV content.

14. The AV content providing system as set forth in claim 12, wherein the second attribute contains the suitability of the AV content to the ages of the individuals in the audience.

15. The AV content providing system as set forth in claim 12, wherein the second attribute contains the suitability of the AV content to the gender of the individuals in the audience.

16. The AV content providing system as set forth in claim 12, wherein the second attribute contains the suitability of the AV content to the type of the particular area.

17. The AV content providing system as set forth in claim 12, wherein the second attribute contains the suitability of the AV content to a time zone.

18. The AV content providing system as set forth in claim 12, wherein the second attribute contains the suitability of the AV content to the relationships within the audience.

19. The AV content providing system as set forth in claim 12, wherein the second attribute contains the suitability of the AV content to the age differences of the individuals in the audience.

20. The AV content providing system as set forth in claim 1, wherein the AV content database is disposed in an external section communicable through a communication unit, the AV content being provided through the communication unit.

21. The AV content providing system as set forth in claim 1, wherein the attribute index is disposed in an external section communicable through a communication unit, the attribute index being provided through the communication unit.

22. The AV content providing system as set forth in claim 1, wherein the attribute index is provided by a detachable recording medium.

23. The AV content providing system as set forth in claim 1, wherein the AV content database, the attribute index, and the selection unit are disposed in an external section communicable through a communication unit, the information that represents the ages and gender of the audience and the personal information that represents the relationships of the audience being obtained by the audience information obtaining unit and transmitted to the selection unit through the communication unit, the AV contents selected by the selection unit according to the information that represents the ages and gender of the audience and that information that represents the relationships of the audiences being provided through the communication unit.

24. An audio/visual (AV) content providing method implemented by an audio/visual content providing device, including a processor, that has been programmed with instructions that cause the computer to provide AV contents to an audience, including more than one individual, who is present within a particular area, the method comprising:

obtaining personal information by the audio/visual content providing device that represents audiences that exist in the particular area and information that represents the relationships amongst individuals included in the audience;

collating by the audio/visual content providing device the personal information that is representative of the audience, the information that is representative of the relationships within the audience, and an attribute index that is correlated with an AV content contained in an AV content database that contains one or a plurality of AV contents and that describes attributes of the AV content and selecting an AV content that is provided to the audiences from the AV content database according to a collated result; and obtaining audience number information that represents the number of individuals in the audience who exist in the particular area and audience position information that represents the positions of individuals in the particular area according to voiced sound information obtained by a voiced sound information obtaining unit.

25. An audio/visual (AV) content providing system that provides AV contents to an audience including more than one individual, which is present within a particular area, comprising:

a processor;

an audience information obtainment unit configured to obtain personal information that represents characteristics of the audience that exist in the particular area and relationship information that represents relationships of one individual in the audience to other individuals in the audience;

an AV content database configured to store one or a plurality of AV contents;

an attribute index that is correlated with AV content contained in the AV content database and that describes attributes of the AV content;

a selection unit configured to collate the personal information that is representative of the audience, the relationship information that is representative of the relationships within the audience, and the attribute index and selecting an AV content that is provided to the audience from the AV content database according to a collated result; and a first audience information obtaining unit configured to obtain audience number information that represents the number of individuals in the audience who exist in the particular area and audience position information that represents the positions of individuals in the particular area according to voiced sound information obtained by a voiced sound information obtaining unit.

* * * * *